Patented Aug. 18, 1925.

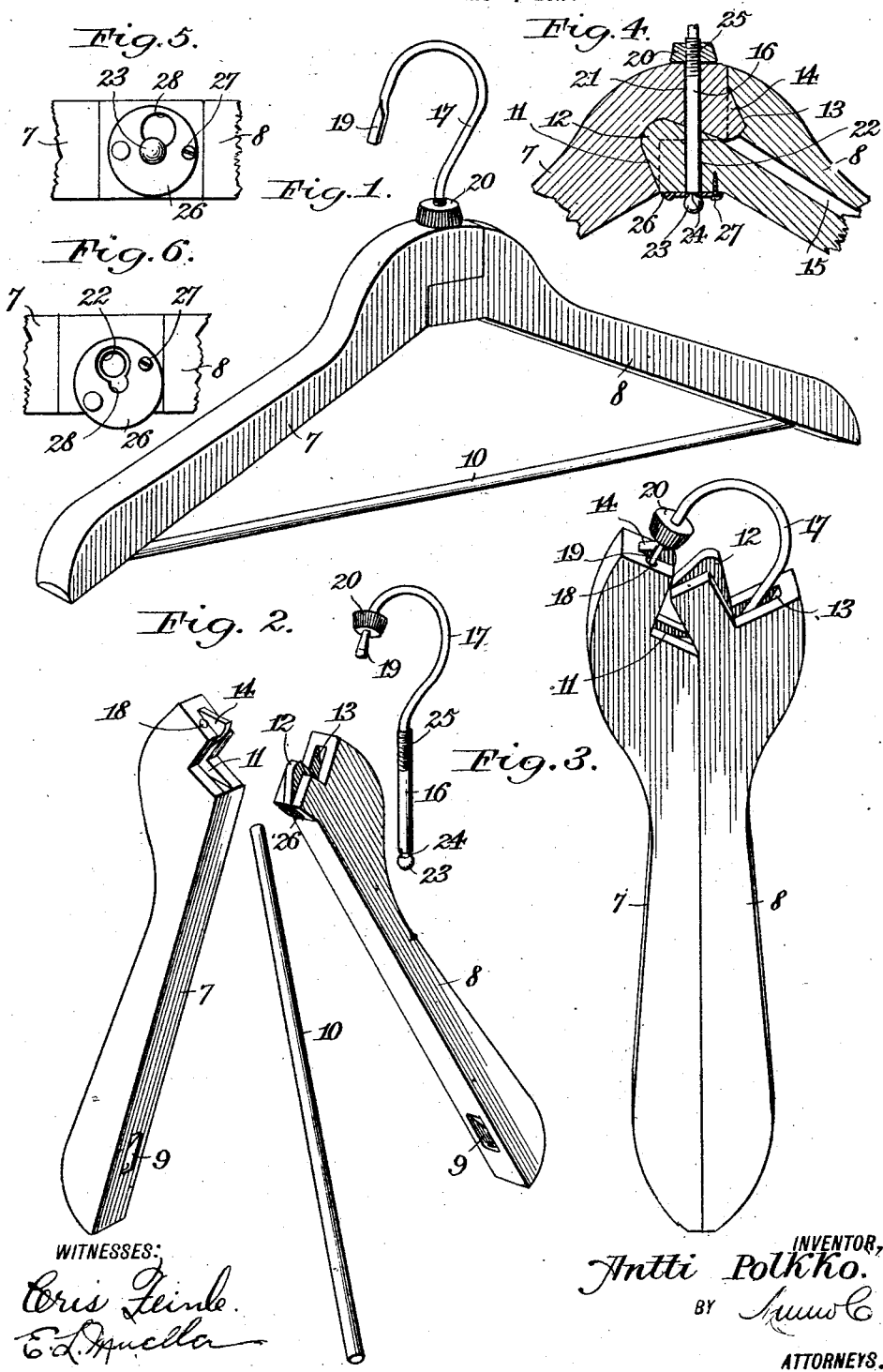

1,550,634

UNITED STATES PATENT OFFICE.

ANTTI POLKKO, OF BROOKLYN, NEW YORK.

GARMENT HANGER.

Application filed June 3, 1924. Serial No. 717,618.

*To all whom it may concern:*

Be it known that I, ANTTI POLKKO, a citizen of Finland, and a resident of the city of New York, borough of Brooklyn, in the county of Kings and State of New York, have invented a new and Improved Garment Hanger, of which the following is a full, clear, and exact description.

This invention relates to improvements in garment hangers, and has for one of its objects the provision of an improved hanger formed of sections which may be readily and quickly assembled and disassembled and which, when in operative position, will be rigidly supported in such position so as to function properly in supporting garments.

Another object is to provide a hanger of simple and inexpensive construction in which the parts thereof, when disassembled, may be compactly arranged so that the parts will occupy a minimum space.

The above and other objects will appear more clearly from the following detailed description, when taken in connection with the accompanying drawing, which illustrates a preferred embodiment of the inventive idea.

In the drawing—

Figure 1 is a perspective view of the hanger constructed in accordance with the invention;

Figure 2 is a similar view of the various parts comprising the hanger;

Figure 3 is a similar view with the parts disassembled and arranged in compact form;

Figure 4 is a fragmentary vertical longitudinal section illustrating the manner of securing the sections of the hanger together;

Figure 5 is a plan view of the latching device employed for retaining the sections in assembled position and showing said device in its operative position; and Figure 6 is a similar view of the device showing it in its unlatching position.

Referring more particularly to the accompanying drawing, the hanger is shown in its preferred form as consisting of a pair of cooperating sections 7 and 8 provided adjacent their free ends and in the under sides thereof with notches 9 for receiving the ends of the supporting rod 10 usually employed for hanging trousers.

The meeting ends of the sections 7 and 8 are cut to provide an overlapping or rabbeted joint with the section 7 having an angular recess 11 therein forming a mortise for receiving the extension or tenon 12 formed upon the end of the section 8. The latter section is also provided with a recess 13 for receiving a correspondingly shaped extension or tenon 14 formed at the end of the section 7. The section 8 is further provided with a longitudinally extending opening 15 communicating at its outer end with the recess 13 and capable of receiving the shank 16 of the hook 17 when the sections are disassembled and arranged in compact formation, as shown in Figure 3. The meeting end of the section 7 is also provided with a small recess 18 arranged adjacent the extension 14 for receiving the free flattened end 19 of the hook 17. This flattened end 19 is provided for preventing detachment of the nut 20 from the free end of the hook. The meeting ends of the sections 7 and 8 are provided, respectively, with transverse openings 21 and 22 which, when the sections are assembled, are aligned with each other to receive the shank 16 of the hook 17. The free end of the shank is provided with a circular enlargement 23, which combines with the adjacent portion of the shank to form an annular groove 24. At the other end of the shank 16 the same is screw threaded, as indicated at 25, to receive the nut 20 which is turned into engagement with the adjacent portion of the section 7 to aid in retaining the hook 17 in its operative position.

To further assist in securing the hook in its operative position, the invention provides a latch preferably in the form of a disk 26 pivoted at 27 adjacent its periphery to the under side of the section 8 and provided with a key-hole opening 28. When mounting the hook in the openings 21 and 22 the latching member is swung to the position shown in Figure 6 with the enlarged portion of the opening 28 aligned with the opening 22 so that the enlargement 23 of the hook will pass through the opening 28. With the annular groove 24 arranged in the same plane as the disk 26 the latter is swung about its pivot to engage the reduced portion of the shank forming the groove 24 in the smaller portion of the opening 28, as shown in Figure 5, whereupon the hook will be secured in position and prevented from moving longitudinally in the openings 21 and 22. After this is done the nut 20 may be adjusted into engagement with the section 7 to bind the hook in position and prevent turning thereof in said openings.

What is claimed is:

1. A garment hanger including sections having their meeting ends overlapping, a supporting hook having its shank extending through said overlapping ends, and a disk pivotally mounted on one of said sections and through which a portion of said hook extends with the disk in engagement with said portion to latch said hook in supporting position, the disk being movable to disengage said portion to permit the hook to be detached.

2. A garment hanger including sections having their meeting ends overlapping, a supporting hook having its shank extending through said overlapping ends, means carried by one of the sections which serves with means on the shank for latching the hook in supporting position and which permits the detachment of the hook to permit the separation of said sections, and means carried by the hook and engageable with one of the sections for preventing rotation of the hook relative to said sections.

3. A garment hanger including sections having their meeting ends overlapping, a supporting hook having its shank extending through said overlapping ends, a disk pivotally mounted on one of said sections and through which a portion of said hook extends with the disk in engagement with said portions to releasably latch said hook in supporting position, and a nut threaded upon said hook and engageable with one of the sections for preventing rotation of the hook relative to said sections.

4. A garment hanger including sections having their meeting ends provided with cooperating recesses and extensions engageable in said recesses, said meeting ends being arranged in overlapping relation and having aligned openings extending transversely therethrough, a supporting hook having a shank capable of being extended through said openings, and a latching member pivoted to one of said sections and having an opening therein through which a portion of said shank extends, a portion of the member surrounding said opening being engageable with said shank to prevent the withdrawal of the hook from said opening.

5. A garment hanger including sections having their meeting ends provided with cooperating recesses and extensions engageable in said recesses, one of said sections also having an opening extending longitudinally thereof and communicating with the recess in said section, said meeting ends being arranged in overlapping relation and having aligned openings extending transversely therethrough, a supporting hook having a shank capable of being extended through said openings, said shank being also insertable into said longitudinal opening in one of the sections when the sections are disassembled, and a latching member pivoted to one of said sections and having an opening therein through which a portion of said shank extends when the sections are assembled, a portion of the member surrounding said opening being engageable with said shank to prevent the withdrawal of the hook from said opening.

ANTTI POLKKO.